US009659517B2

(12) United States Patent
Wu

(10) Patent No.: US 9,659,517 B2
(45) Date of Patent: May 23, 2017

(54) CONVERTING SYSTEM AND CONVERTING METHOD OF THREE-COLOR DATA TO FOUR-COLOR DATA

(71) Applicant: Shenzhen China Star Optoelectronics Technology Co., Ltd., Shenzhen, Guangdong (CN)

(72) Inventor: Jinjun Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 199 days.

(21) Appl. No.: 14/425,315

(22) PCT Filed: Nov. 7, 2014

(86) PCT No.: PCT/CN2014/090652
§ 371 (c)(1),
(2) Date: Mar. 2, 2015

(87) PCT Pub. No.: WO2016/070433
PCT Pub. Date: May 12, 2016

(65) Prior Publication Data

US 2016/0365016 A1 Dec. 15, 2016

(30) Foreign Application Priority Data

Nov. 4, 2014 (CN) .......................... 2014 1 0614254

(51) Int. Cl.
*G09G 3/20* (2006.01)
*G09G 3/32* (2016.01)
(Continued)

(52) U.S. Cl.
CPC ......... *G09G 3/2003* (2013.01); *G09G 3/3225* (2013.01); *G09G 3/3266* (2013.01);
(Continued)

(58) Field of Classification Search
CPC combination set(s) only.
See application file for complete search history.

(56) References Cited

U.S. PATENT DOCUMENTS 8,094,933 B2 * 1/2012 Cok .................... G09G 3/2003 345/694
2004/0263456 A1 * 12/2004 Miyachi ............... G09G 3/3607 345/88

(Continued)

FOREIGN PATENT DOCUMENTS

CN 101008722 A 8/2007

*Primary Examiner* — Wesner Sajous
(74) *Attorney, Agent, or Firm* — Andrew C. Cheng

(57) ABSTRACT

A converting system and a converting method of three-color data to four-color data are provided. The converting system includes: a first calculating part configured to calculate a saturation value and a luminance enhancement coefficient according to inputted RGB values, a second calculating part configured to calculate luminance-enhanced RGB values according to the luminance enhancement coefficient and the inputted RGB values, a white determining part configured to use a minimum value of the luminance-enhanced RGB values as an outputted W value, and a three-color determining part configured to calculate outputted RGB values according to the luminance-enhanced RGB values and the outputted W value. The invention can obtain optimal outputted W values for different inputted RGB values and maximally increase the transmittance of the display apparatus. Accordingly, the display apparatus can increase the saturation of display image while enhance the transmittance.

16 Claims, 2 Drawing Sheets

(51) Int. Cl.

| | |
|---|---|
| ***G09G 3/36*** | (2006.01) |
| ***H04N 1/60*** | (2006.01) |
| ***H04N 1/46*** | (2006.01) |
| ***H04N 5/202*** | (2006.01) |
| ***H04N 9/64*** | (2006.01) |
| ***H04N 9/77*** | (2006.01) |
| ***H04N 9/73*** | (2006.01) |
| ***H04N 5/57*** | (2006.01) |
| ***G09G 5/02*** | (2006.01) |
| ***G09G 3/3225*** | (2016.01) |
| ***G09G 3/3266*** | (2016.01) |
| ***G09G 3/3275*** | (2016.01) |

(52) U.S. Cl.

CPC ......... *G09G 3/3275* (2013.01); *G09G 3/3677* (2013.01); *G09G 3/3688* (2013.01); *G09G 5/02* (2013.01); *G09G 2300/0426* (2013.01); *G09G 2300/0452* (2013.01); *G09G 2320/0276* (2013.01); *G09G 2340/06* (2013.01); *G09G 2360/16* (2013.01)

(56) References Cited

U.S. PATENT DOCUMENTS

| | | | | |
|---|---|---|---|---|
| 2009/0046307 | A1* | 2/2009 | Kwak ...................... | G09G 5/02 358/1.9 |
| 2014/0267442 | A1* | 9/2014 | Lin ...................... | G09G 3/3208 345/690 |
| 2015/0312542 | A1* | 10/2015 | Suginohara .......... | G09G 3/2003 345/603 |

* cited by examiner

CONVERTING SYSTEM AND CONVERTING METHOD OF THREE-COLOR DATA TO FOUR-COLOR DATA

TECHNICAL FIELD

The present invention relates to the field of display technology, and particularly to a converting system and a converting method of three-color data to four-color data.

DESCRIPTION OF RELATED ART

Nowadays, in the display apparatuses having such as liquid crystal display (LCD) panels or organic light emitting diode (OLED) display panels, most of which use a red (R) sub-pixel unit, a green (G) sub-pixel unit and a blue (B) sub-pixel unit together to constitute one pixel unit. By controlling R data of the red sub-pixel unit, G data of the green sub-pixel unit and B data of the blue sub-pixel unit to mix a color wanted to be displayed by a display panel, a color image can be displayed.

With the development of information technology, various requirements of display panel are increasing, such as high transmittance, low power consumption and good image quality are becoming the demands of people to the display panel. The transmittance and mixing efficiency of the conventional RGB three primary color mixing display manner are relatively low, resulting in the power consumption of display panel is high, which restricts the product optimization of display panel. Accordingly, a display panel having a four-pixel unit constituted by a red (R) sub-pixel unit, a green (G) sub-pixel unit, a blue (B) sub-pixel unit and a fourth sub-pixel unit together has been proposed. Since the transmittance of the W (white) sub-pixel unit is very high, which can greatly increase the transmittance of the display panel, and therefore the brightness of backlight can be reduced so as to achieve the energy saving effect.

Generally, information of image or video is stored by RGB three channels, but the display panel of four-pixel unit needs to use WRGB four sub-pixel units to achieve the display, and therefore there is a need of converting inputted RGB data into WRGB data as output. However, a conventional converting method of three color (i.e., RGB) data to four color (i.e., WRGB) data cannot obtain optimal W output values for different inputted RGB values, i.e., cannot maximally increase the transmittance of the display panel.

SUMMARY

In order to solve the problem in the prior art, an objective of the present invention is to provide a converting system of three-color data to four-color data. The converting system includes: a first calculation part configured (i.e., structured and arranged) to calculate a saturation value and a luminance enhancement coefficient according to inputted RGB values, a second calculating part configured to calculate luminance-enhanced RGB values according to the luminance enhancement coefficient and the inputted RGB values, a white determining part configured to use a minimum value of the luminance-enhanced RGB values as an outputted W value, and a three-color determining part, configured to calculate outputted RGB values according to the luminance-enhanced RGB values and the outputted W value.

In an exemplary embodiment, the first calculating part further is configured to use an expression [1] to calculate the saturation value and the luminance enhancement coefficient, and the expression [1] is that:

$$s = 1 - 3 \times \frac{\mathrm{Min}(r, g, b)}{r + g + b},\ K = 1 + (K_0 - 1) \times (1 - s),\ K_0 = L2/L1$$

where s represents the saturation value, r represents the inputted R value, g represents the inputted G value, b represents the inputted B value, Min(r, g, b) represents a minimum value of r, g and b, K represents the luminance enhancement coefficient, L1 represents a maximum luminance value corresponding to the inputted RGB values, L2 represents a maximum luminance value corresponding to the outputted WRGB values.

In an exemplary embodiment, the first calculating part further is configured to use an expression [2] to calculate the saturation value and the luminance enhancement coefficient, and the expression [2] is that:

$$s = 1 - \frac{\mathrm{Min}(r, g, b)}{\mathrm{Max}(r, g, b)},\ K = 1 + (K_0 - 1) \times (1 - s),\ K_0 = L2/L1$$

where s represents the saturation value, r represents the inputted R value, g represents the inputted G value, b represents the inputted B value, Min(r, g, b) represents a minimum value of r, g and b, Max(r, g, b) represents a maximum value of r, g and b, K represents the luminance enhancement coefficient, L1 represents a maximum luminance value corresponding to the inputted RGB values, L2 represents a maximum luminance value corresponding to the outputted WRGB values.

In an exemplary embodiment, the second calculating part further is configured to use an expression [3] to calculate the luminance-enhanced RGB values, and the expression [3] is that:

$$R_1 = K^{\frac{1}{\gamma}} \times r,\ G_1 = K^{\frac{1}{\gamma}} \times g,\ B_1 = K^{\frac{1}{\gamma}} \times b$$

where r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, γ represents a gamma value.

In an exemplary embodiment, the three-color determining part further is configured to use an expression [4] to calculate the outputted RGB values, and the expression [4] is that:

$$R_2 = (R_1^\gamma - R_b^\gamma)^{\frac{1}{\gamma}},\ G_2 = (G_1^\gamma - G_b^\gamma)^{\frac{1}{\gamma}},\ B_2 = (B_1^\gamma - B_b^\gamma)^{\frac{1}{\gamma}},\ R_b + G_b + B_b = W_2$$

where $R_2$ represents the outputted R value, $G_2$ represents the outputted G value, $B_2$ represents the outputted B value, $W_2$ represents the outputted W value, γ represents a gamma value, $R_1$ represents the luminance-enhanced R value, $G_1$ represents the luminance-enhanced G value, $B_1$ represents the luminance-enhanced B value.

Another objective of the invention is to provide a converting method of three-color data to four-color data. The converting method includes: calculating a saturation value and a luminance enhancement coefficient based on inputted RGB values; calculating luminance-enhanced RGB values based on the luminance enhancement coefficient and the inputted RGB values; using a minimum value of the luminance-enhanced RGB values as an outputted W value; and calculating outputted RGB values based on the luminance-enhanced RGB values and the outputted W value.

In an exemplary embodiment, an expression [1] is used to calculate the saturation value and the luminance enhancement coefficient, and the expression [1] is that:

$$s = 1 - 3 \times \frac{\mathrm{Min}(r, g, b)}{r + g + b}, K = 1 + (K_0 - 1) \times (1 - s), K_0 = L2/L1$$

where s represents the saturation value, r represents the inputted R value, g represents the inputted G value, b represents the inputted B value, Min(r, g, b) represents a minimum value of r, g and b, K represents the luminance enhancement coefficient, L1 represents a maximum luminance value corresponding to the inputted RGB values, L2 represents a maximum luminance value corresponding to the outputted WRGB values.

In an exemplary embodiment, an expression [2] is used to calculate the saturation value and the luminance enhancement coefficient, and the expression [2] is that:

$$s = 1 - \frac{\mathrm{Min}(r, g, b)}{\mathrm{Max}(r, g, b)}, K = 1 + (K_0 - 1) \times (1 - s), K_0 = L2/L1$$

where s represents the saturation value, r represents the inputted R value, g represents the inputted G value, b represents the inputted B value, Min(r, g, b) represents a minimum value of r, g and b, Max(r, g, b) represents a maximum value of r, g and b, K represents the luminance enhancement coefficient, L1 represents a maximum luminance value corresponding to the inputted RGB values, L2 represents a maximum luminance value corresponding to the outputted WRGB values.

In an exemplary embodiment, an expression [3] is used to calculate the luminance-enhanced RGB values, and the expression [3] is that:

$$R_1 = K^{\frac{1}{\gamma}} \times r, G_1 = K^{\frac{1}{\gamma}} \times g, B_1 = K^{\frac{1}{\gamma}} \times b$$

where r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, γ represents a gamma value.

In an exemplary embodiment, an expression [4] is used to calculate the outputted RGB values, and the expression [4] is that:

$$R_2 = (R_1^{\gamma} - R_b^{\gamma})^{\frac{1}{\gamma}}, G_2 = (G_1^{\gamma} - G_b^{\gamma})^{\frac{1}{\gamma}}, B_2 = (B_1^{\gamma} - B_b^{\gamma})^{\frac{1}{\gamma}}, R_b + G_b + B_b = W_2$$

where $R_2$ represents the outputted R value, $G_2$ represents the outputted G value, $B_2$ represents the outputted B value, $W_2$ represents the outputted W value, γ represents a gamma value, $R_1$ represents the luminance-enhanced R value, $G_1$ represents the luminance-enhanced G value, $B_1$ represents the luminance-enhanced B value.

The converting system and converting method of three-color data to four-color data according to the invention can obtain optimal outputted W values for different inputted RGB values and maximally increase the transmittance of a display apparatus. Accordingly, the display apparatus can increase the saturation of display image while enhances the transmittance.

BRIEF DESCRIPTION OF THE DRAWINGS

The above and other aspects, features and advantages of embodiments of the invention will be more apparent from the following detailed description taken in conjunction with the accompanying drawings, in which.

DETAILED DESCRIPTION OF EMBODIMENTS

In the following, various embodiments of the invention will be described in detail with reference to accompanying drawings. The invention may be embodied in many different forms and should not be construed as limiting to the embodiments set forth herein. Rather, these embodiments are provided to explain the principles of the invention and its practical applications, so that other skilled in the art can understand various embodiments of the invention and various modifications suitable for specific intended applications.

In the following embodiments, the display apparatus for example is a liquid crystal display (LCD) apparatus, an organic light emitting diode (OLED) display apparatus, and so on.

Figure 1:
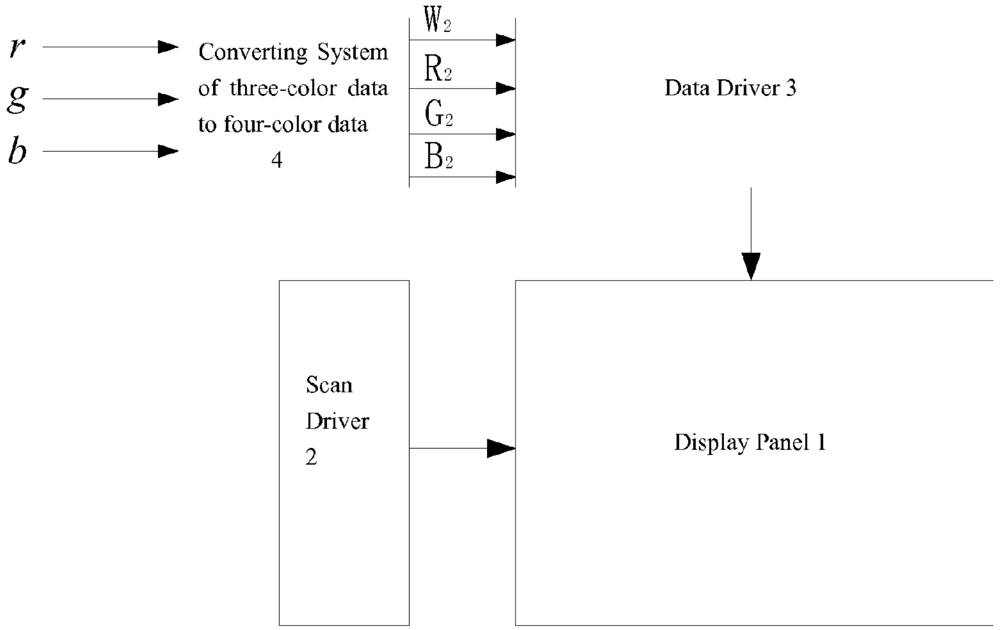
FIG. 1 is a schematic block diagram of a display apparatus according to an embodiment of the invention.
Figure 2:
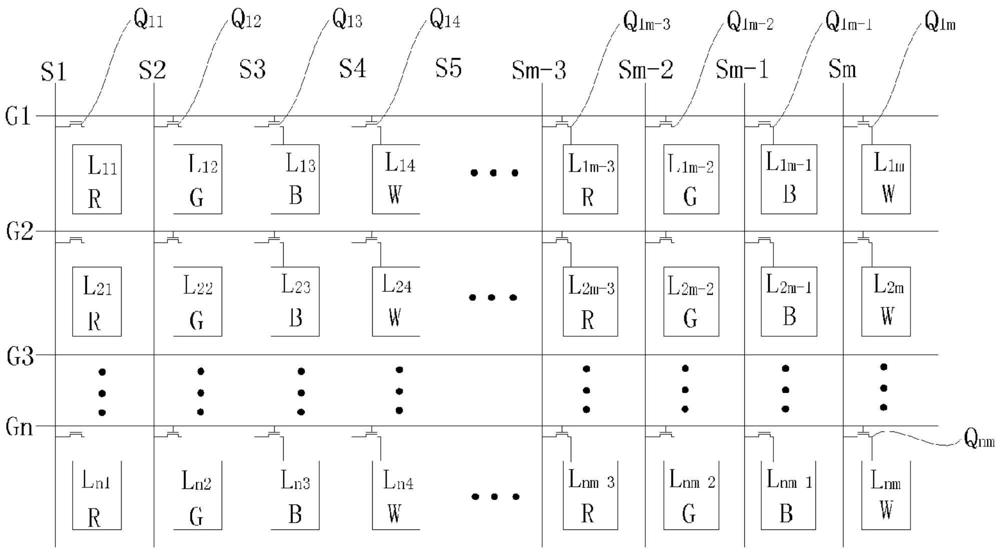
FIG. 2 is a schematic structural view of a display panel according to an embodiment of the invention.

FIG. 1 is a schematic block diagram of a display apparatus according to an embodiment of the invention. FIG. 2 is a schematic structural view according to an embodiment of the invention.

Referring to FIG. 1 and FIG. 2 together, the display apparatus according to the embodiment of the invention includes a display panel 1, a scan driver 2, a data driver 3 and a converting system 4 of three color (i.e., RGB) data to four color (i.e., WRGB) data.

The display panel 1 includes scan lines G1 to Gn (n is a natural number) extending along row direction, and data lines S1 to Sm (in is a natural number) extending along column direction. The scan lines G1 to Gn are connected to the scan driver 2. The data lines S1 to Sm are connected to the data driver 3.

Each sub-pixel Lij, i.e., a red (R) sub-pixel, a green (G) sub-pixel, a blue (B) sub-pixel or a white (W) sub-pixel, is arranged in a region defined by scan lines Gi, Gi+1 (i is any one of natural numbers from 1 to n) and data lines Sj, Sj+1 (j is any one of natural numbers from 1 to in). In the illustrated embodiment, one red (R) sub-pixel, one green (G) sub-pixel, one blue (B) sub-pixel and one white (W) sub-pixel together constitute one pixel.

Each thin film transistor (TFT) Qij is arranged near an intersection of the scan line Gi and the data line Sj.

Moreover, the scan line Gi is connected to a gate of the thin film transistor Qij, the data line Sj is connected to a source of the thin film transistor Qij, and a pixel electrode of the sub-pixel Lij (i.e., a red sub-pixel, a green sub-pixel, a blue sub-pixel or a white sub-pixel) is connected to a drain of the thin film transistor Qij. A common electrode arranged opposite to the pixel electrode of the sub-pixel Lij is connected to a common voltage circuit (not shown).

The scan driver 2 and the data driver 3 are arranged at the periphery of the display panel 1. The converting system 4 of three-color data to four-color data is configured (i.e., structured and arranged) for converting inputted RGB values into outputted WRGB values and providing the outputted WRGB values to the data driver 3. The inputted RGB values are provided for example from an external host computer or graphic controller (not shown).

The data driver 3 is configured for receiving and processing outputted WRGB values provided from the converting system 4 of three-color data to four-color data to thereby generate analog data signals and then provide the analog data signals onto the data lines S1 to Sm. The scan driver 2 is configured for sequentially providing multiple scan signals onto the scan lines G1 to Gn. The display panel 1 is configured for displaying an image based on the analog data signals provided by the data driver 3 and the scan signals provided by the scan driver 2.

Hereinafter, the converting system 4 of three-color data to four-color data according to the embodiment of the invention will be described in detail.

Figure 3:
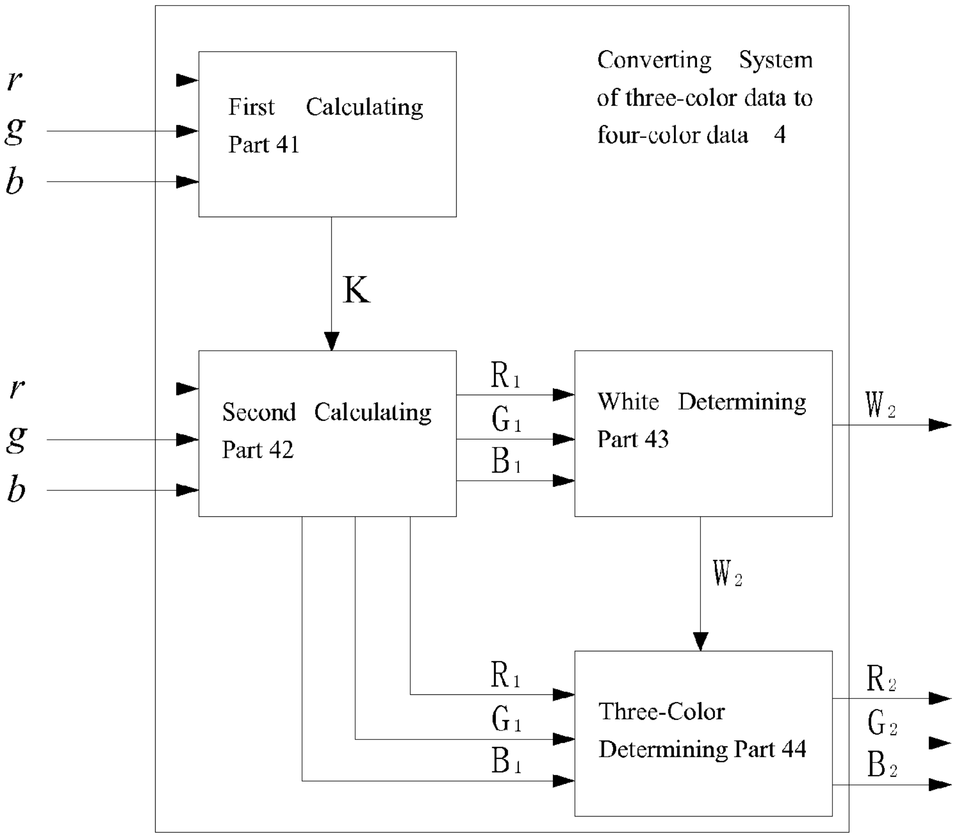
FIG. 3 is a principal block diagram of a converting system of three-color data to four-color data according to an embodiment of the invention.

FIG. 3 is a principal block diagram of the converting system of three-color data to four-color data according to an embodiment of the invention.

Referring to FIG. 3, the converting system 4 of three-color data to four-color data according to the embodiment of the invention includes: a first calculating part 41, a second calculating part 42, a white determining part 43 and a three-color determining part 44. For example, in an embodiment, the converting system 4 of three-color data to four-color data includes one or more processors and a memory storing software modules executed by the one or more processors including the first calculating part 41, the second calculating part 42, the white determining part 43 and the three-color determining part 44.

Concretely speaking, the first calculating part 41 is configured for receiving inputted RGB values and calculating a saturation value and a luminance enhancement coefficient according to the inputted RGB values. Herein, the saturation value is a saturation value corresponding to the inputted RGB values.

Furthermore, the first calculating part 41 can use the following expression [1] to calculate the saturation value and the luminance enhancement coefficient.

Expression [1]:

$$s = 1 - 3\times\frac{\mathrm{Min}(r, g, b)}{r+g+b},\ K = 1 + (K_0 - 1)\times(1 - s),\ K_0 = L2/L1$$

Where, s represents the saturation value, r represents the inputted R value, g represents the inputted G value, b represents the inputted B value, Min(r, g, b) represents the minimum value of r, g and b, K represents the luminance enhancement coefficient, L1 represents a maximum luminance value corresponding to the inputted RGB values, and L2 represents a maximum luminance value corresponding to the outputted WRGB values.

In addition, the first calculating part 41 can use the following expression [2] to calculate the saturation value and the luminance enhancement coefficient instead.

Expression [2]:

$$s = 1 - \frac{\mathrm{Min}(r, g, b)}{\mathrm{Max}(r, g, b)},\ K = 1 + (K_0 - 1)\times(1 - s),\ K_0 = L2/L1$$

Where, s represents the saturation value, r represents the inputted R value, g represents the inputted G value, b represents the inputted B value, Min(r, g, b) represents the minimum value of r, g and b, Max(r, g, b) represents the maximum value of r, g and b, K represents the luminance enhancement coefficient, L1 represents a maximum luminance value corresponding to the inputted RGB values, and L2 represents a maximum luminance value corresponding to the outputted WRGB values.

The first calculating part 41 provides the calculated luminance enhancement coefficient to the second calculating part 42. The second calculating part 42 is configured for receiving the inputted RGB values and the luminance enhancement coefficient provided by the first calculating part 41 and calculating luminance-enhanced RGB values according to the inputted RGB values and the luminance enhance coefficient.

Furthermore, the second calculating part 42 uses the following expression [3] to calculate the luminance enhanced RGB values.

Expression [3]:

$$R_1 = K^{\frac{1}{\gamma}}\times r,\ G_1 = K^{\frac{1}{\gamma}}\times g,\ B_1 = K^{\frac{1}{\gamma}}\times b$$

Where, r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, $\gamma$ represents a gamma value.

The second calculating part 42 provides the calculated luminance-enhanced RGB values to the white determining part 43 and the three-color determining part 44. The white determining part 43 is configured for receiving the luminance-enhanced RGB values provided by the second calculating part 42 and using a minimum value of the received luminance-enhanced RGB values $\mathrm{Min}(R_1, G_1, B_1)$ as an outputted W value. Herein, if the outputted W value is greater than 255, the white determining part 43 keeps the outputted W values as 255.

The white determining part 43 provides the determined outputted W value to the three-color determining part 44. The three-color determining part 44 is configured for receiving the luminance-enhanced RGB values provided by the second calculating part 42 and the outputted W values provided by the white determining part 43 and calculating outputted RGB values according to the received luminance-enhanced RGB values and the outputted W value.

Furthermore, the three-color determining part 44 uses the following expression [4] to calculate the outputted RGB values.

Expression [4]:

$$R_2=(R_1^\gamma-R_b^\gamma)^{\frac{1}{\gamma}},\ G_2=(G_1^\gamma-G_b^\gamma)^{\frac{1}{\gamma}},\ B_2=(B_1^\gamma-B_b^\gamma)^{\frac{1}{\gamma}},\ R_b+G_b+B_b=W_2$$

Where, $R_2$ represents the outputted R value, $G_2$ represents the outputted G value, $B_2$ represents the outputted B value, W2 represents the outputted W value, $\gamma$ represents a gamma value, $R_1$ represents the luminance-enhanced R value, $G_1$ represents the luminance-enhanced G value, $B_1$ represents the luminance-enhanced B value.

The white determining part 43 provides the outputted W value to the data driver 3, and the three-color determining part 44 provides the calculated outputted RGB values to the data driver 3.

Figure 4:
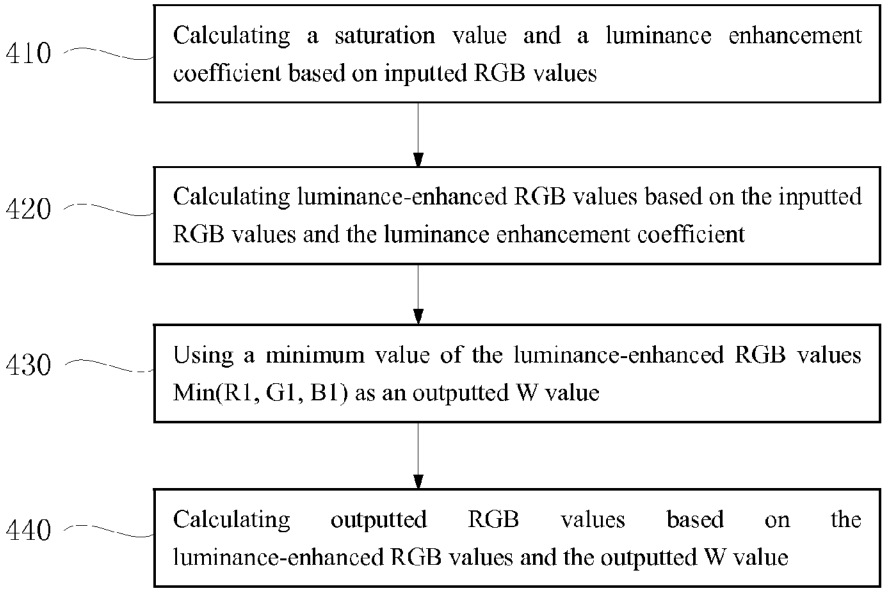
FIG. 4 is a flowchart of a converting method of three-color data to four-color data according to an embodiment of the invention.

FIG. 4 is a flowchart of a converting method of three-color data to four-color data according to an embodiment of the invention.

As shown in FIG. 4, in step 410, a saturation value and a luminance enhancement coefficient are calculated based on inputted RGB values. Herein, the saturation value is a saturation value corresponding to the inputted RGB values.

Furthermore, in the step 410, the saturation value and the luminance enhancement coefficient can be calculated by using the above expression [1] or expression [2].

In step 420, luminance-enhanced RGB values are calculated based on the inputted RGB values and the luminance enhancement coefficient. Moreover, in the step 420, the luminance-enhanced RGB values can be calculated by using the above expression [3].

In step 430, a minimum value of the luminance-enhanced RGB values $\mathrm{Min}(R_1, G_1, B_1)$ is used as an outputted W value. Herein, if the outputted W value is greater than 255, the white determining part 43 keeps the outputted W value at 255.

In step 440, outputted RGB values are calculated based on the luminance-enhanced RGB values and the outputted W value. Moreover, in the step 440, the outputted RGB values can be calculated by using the above expression [4].

In summary, the converting system and converting method of three-color data to four-color data according to the embodiments of the invention can obtain the optimal outputted W values for different inputted RGB values and maximally increase the transmittance of display apparatus, so that the display apparatus can increase the saturation of display image while enhances the transmittance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A converting system of three-color data to four-color data, adapted for a display apparatus equipped with a data driver, the converting system comprising:

a first calculating part, configured to calculate a saturation value and a luminance enhancement coefficient according to inputted RGB values;

a second calculating part, configured to calculate luminance-enhanced RGB values according to the luminance enhancement coefficient and the inputted RGB values;

a white determining part, configured to use a minimum value of the luminance-enhanced RGB values as an outputted W value and provide the outputted W value to the data driver;

a three-color determining part, configured to calculate outputted RGB values according to the luminance-enhanced RGB values and the outputted W value and provide the outputted RGB values to the data driver.

2. The converting system according to claim 1, wherein the first calculating part further is configured to use an expression [1] to calculate the saturation value and the luminance enhancement coefficient, and the expression [1] is that:

$$s=1-3\times\frac{\mathrm{Min}(r,g,b)}{r+g+b},\ K=1+(K_0-1)\times(1-s),\ K_0=L2/L1$$

where s represents the saturation value, r represents the inputted R value, g represents the inputted G value, b represents the inputted B value, Min(r, g, b) represents a minimum value of r, g and b, K represents the luminance enhancement coefficient, L1 represents a maximum luminance value corresponding to the inputted RGB values, L2 represents a maximum luminance value corresponding to the outputted WRGB values.

3. The converting system according to claim 1, wherein the first calculating part further is configured to use an expression [2] to calculate the saturation value and the luminance enhancement coefficient, and the expression [2] is that:

$$s=1-\frac{\mathrm{Min}(r,g,b)}{\mathrm{Max}(r,g,b)},\ K=1+(K_0-1)\times(1-s),\ K_0=L2/L1$$

where s represents the saturation value, r represents the inputted R value, g represents the inputted G value, b represents the inputted B value, Min(r, g, b) represents a minimum value of r, g and b, Max(r, g, b) represents a maximum value of r, g and b, K represents the luminance enhancement coefficient, L1 represents a maximum luminance value corresponding to the inputted RGB values, L2 represents a maximum luminance value corresponding to the outputted WRGB values.

4. The converting system according to claim 1, wherein the second calculating part further is configured to use an expression [3] to calculate the luminance-enhanced RGB values, and the expression [3] is that:

$$R_1=K^{\frac{1}{\gamma}}\times r,\ G_1=K^{\frac{1}{\gamma}}\times g,\ B_1=K^{\frac{1}{\gamma}}\times b$$

where r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, $\gamma$ represents a gamma value.

5. The converting system according to claim 1, wherein the three-color determining part further is configured to use an expression [4] to calculate the outputted RGB values, and the expression [4] is that:

$$R_2=(R_1^\gamma-R_b^\gamma)^{\frac{1}{\gamma}},\ G_2=(G_1^\gamma-G_b^\gamma)^{\frac{1}{\gamma}},\ B_2=(B_1^\gamma-B_b^\gamma)^{\frac{1}{\gamma}},\ R_b+G_b+B_b=W_2$$

where $R_2$ represents the outputted R value, $G_2$ represents the outputted G value, $B_2$ represents the outputted B value, $W_2$ represents the outputted W value, $\gamma$ represents a gamma value, $R_1$ represents the luminance-enhanced R value, $G_1$ represents the luminance-enhanced G value, $B_1$ represents the luminance-enhanced B value.

6. A converting method of three-color data to four-color data, adapted for a display apparatus equipped with a data driver, the converting method comprising:

calculating a saturation value and a luminance enhancement coefficient based on inputted RGB values;

calculating luminance-enhanced RGB values based on the luminance enhancement coefficient and the inputted RGB values;

using a minimum value of the luminance-enhanced RGB values as an outputted W value;

calculating outputted RGB values based on the luminance-enhanced RGB values and the outputted W value;

providing the outputted W value and the outputted RGB values to the data driver to generate analog data signals.

7. The converting method according to claim 6, wherein an expression [1] is used to calculate the saturation value and the luminance enhancement coefficient, and the expression [1] is that:

$$s=1-3\times\frac{\mathrm{Min}(r,g,b)}{r+g+b},\ K=1+(K_0-1)\times(1-s),\ K_0=L2/L1$$

where s represents the saturation value, r represents the inputted R value, g represents the inputted G value, b represents the inputted B value, Min(r, g, b) represents a minimum value of r, g and b, K represents the luminance enhancement coefficient, L1 represents a maximum luminance value corresponding to the inputted RGB values, L2 represents a maximum luminance value corresponding to the outputted WRGB values.

8. The converting method according to claim 6, wherein an expression [2] is used to calculate the saturation value and the luminance enhancement coefficient, and the expression [2] is that:

$$s=1-\frac{\mathrm{Min}(r,g,b)}{\mathrm{Max}(r,g,b)},\ K=1+(K_0-1)\times(1-s),\ K_0=L2/L1$$

where s represents the saturation value, r represents the inputted R value, g represents the inputted G value, b represents the inputted B value, Min(r, g, b) represents a minimum value of r, g and b, Max(r, g, b) represents a maximum value of r, g and b, K represents the luminance enhancement coefficient, L1 represents a maximum luminance value corresponding to the inputted RGB values, L2 represents a maximum luminance value corresponding to the outputted WRGB values.

9. The converting method according to claim 6, wherein an expression [3] is used to calculate the luminance-enhanced RGB values, and the expression [3] is that:

$$R_1=K^{\frac{1}{\gamma}}\times r,\ G_1=K^{\frac{1}{\gamma}}\times g,\ B_1=K^{\frac{1}{\gamma}}\times b$$

where r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, $\gamma$ represents a gamma value.

10. The converting method according to claim 6, wherein an expression [4] is used to calculate the outputted RGB values, and the expression [4] is that:

$$R_2=(R_1^\gamma-R_b^\gamma)^{\frac{1}{\gamma}},\ G_2=(G_1^\gamma-G_b^\gamma)^{\frac{1}{\gamma}},\ B_2=(B_1^\gamma-B_b^\gamma)^{\frac{1}{\gamma}},\ R_b+G_b+B_b=W_2$$

where $R_2$ represents the outputted R value, $G_2$ represents the outputted G value, $B_2$ represents the outputted B value, $W_2$ represents the outputted W value, $\gamma$ represents a gamma value, $R_1$ represents the luminance-enhanced R value, $G_1$ represents the luminance-enhanced G value, $B_1$ represents the luminance-enhanced B value.

11. A display apparatus comprising a display panel, a data driver, a scan driver, and a converting system of three-color data to four-color data; the converting system comprising one or more processors and a memory storing software modules executed by the one or more processors including a first calculating part, a second calculating part, a white determining part and a three-color determining part; wherein:

the first calculating part is configured to calculate a saturation value and a luminance enhancement coefficient according to inputted RGB values;

the second calculating part is configured to calculate luminance-enhanced RGB values according to the luminance enhancement coefficient and the inputted RGB values;

the white determining part is configured to use a minimum value of the luminance-enhanced RGB values as an outputted W value;

the three-color determining part is configured to calculate outputted RGB values according to the luminance-enhanced RGB values and the outputted W value.

12. The display apparatus according to claim 11, wherein the first calculating part further is configured to use an expression [1] to calculate the saturation value and the luminance enhancement coefficient, and the expression [1] is that:

$$s=1-3\times\frac{\mathrm{Min}(r,g,b)}{r+g+b},\ K=1+(K_0-1)\times(1-s),\ K_0=L2/L1$$

where s represents the saturation value, r represents the inputted R value, g represents the inputted G value, b represents the inputted B value, Min(r, g, b) represents a minimum value of r, g and b, K represents the luminance enhancement coefficient, L1 represents a maximum luminance value corresponding to the inputted RGB values, L2 represents a maximum luminance value corresponding to the outputted WRGB values.

13. The display apparatus according to claim 11, wherein the first calculating part further is configured to use an expression [2] to calculate the saturation value and the luminance enhancement coefficient, and the expression [2] is that:

$$s = 1 - \frac{\mathrm{Min}(r, g, b)}{\mathrm{Max}(r, g, b)},\ K = 1 + (K_0 - 1)\times(1 - s),\ K_0 = L2/L1$$

where s represents the saturation value, r represents the inputted R value, g represents the inputted G value, b represents the inputted B value, Min(r, g, b) represents a minimum value of r, g and b, Max(r, g, b) represents a maximum value of r, g and b, K represents the luminance enhancement coefficient, L1 represents a maximum luminance value corresponding to the inputted RGB values, L2 represents a maximum luminance value corresponding to the outputted WRGB values.

14. The display apparatus according to claim 11, wherein the second calculating part further is configured to use an expression [3] to calculate the luminance-enhanced RGB values, and the expression [3] is that:

$$R_1 = K^{\frac{1}{\gamma}} \times r,\ G_1 = K^{\frac{1}{\gamma}} \times g,\ B_1 = K^{\frac{1}{\gamma}} \times b$$

where r represents the inputted R value, g represents the inputted G value, b represents the inputted B value, K represents the luminance enhancement coefficient, $R_1$ represents the luminance-enhanced R value, $G_1$ represents the luminance-enhanced G value, $B_1$ represents the luminance-enhanced B value, γ represents a gamma value.

15. The display apparatus according to claim 11, wherein the three-color determining part further is configured to use an expression [4] to calculate the outputted RGB values, and the expression [4] is that:

$$R_2 = (R_1^{\gamma} - R_b^{\gamma})^{\frac{1}{\gamma}},\ G_2 = (G_1^{\gamma} - G_b^{\gamma})^{\frac{1}{\gamma}},\ B_2 = (B_1^{\gamma} - B_b^{\gamma})^{\frac{1}{\gamma}},\ R_b + G_b + B_b = W_2$$

where $R_2$ represents the outputted R value, $G_2$ represents the outputted G value, $B_2$ represents the outputted B value, $W_2$ represents the outputted W value, γ represents a gamma value, $R_1$ represents the luminance-enhanced R value, $G_1$ represents the luminance-enhanced G value, $B_1$ represents the luminance-enhanced B value.

16. The display apparatus according to claim 11, wherein the display apparatus is a liquid crystal display apparatus or an organic light emitting diode display apparatus.

* * * * *